United States Patent [19]

Steffens et al.

[11] Patent Number: 5,767,635
[45] Date of Patent: Jun. 16, 1998

[54] DISPLACEMENT MACHINE WITH ELECTRONIC MOTOR SYNCHRONIZATION

[75] Inventors: Ralf Steffens, Lohbarbek; Andreas Salmen, Itzehoe, both of Germany

[73] Assignee: SIHI GmbH & Co. KG, Itzehoe, Germany

[21] Appl. No.: 553,318

[22] PCT Filed: Jun. 3, 1994

[86] PCT No.: PCT/EP94/01818

§ 371 Date: Nov. 21, 1995

§ 102(e) Date: Nov. 21, 1995

[87] PCT Pub. No.: WO94/29596

PCT Pub. Date: Dec. 22, 1994

[30] Foreign Application Priority Data

Jun. 4, 1993 [DE] Germany ............... P 43 18 707.2

[51] Int. Cl.$^6$ ............... H02P 5/46; F04C 29/00; G05D 13/62

[52] U.S. Cl. ............... 318/85; 318/41; 318/616; 318/625; 318/49

[58] Field of Search ............... 318/560–696, 318/85, 87, 77, 654, 625, 39–88; 417/16, 338, 410 C, 18, 3, 5, 7, 45, 53, 63, 6, 900, 42, 203, 205, 423.4, 201.1

[56] References Cited

U.S. PATENT DOCUMENTS

| | | | |
|---|---|---|---|
| 5,197,861 | 3/1993 | Maruyama et al. | 417/42 |
| 5,329,316 | 7/1994 | Hasegawa et al. | 318/654 |

FOREIGN PATENT DOCUMENTS

| | | | |
|---|---|---|---|
| 0 472 933 A2 | 3/1992 | European Pat. Off. | F04C 29/00 |
| 0 502 459 A2 | 9/1992 | European Pat. Off. | G05D 13/62 |
| 0 558 921 A1 | 9/1993 | European Pat. Off. | G05D 13/62 |
| 28 11 368 A1 | 9/1979 | Germany | G01D 7/00 |
| 32 30 550 A1 | 1/1984 | Germany | F04C 2/14 |
| 36 40 452 A1 | 6/1988 | Germany | G01L 3/24 |
| 37 06 588 C1 | 8/1988 | Germany | F04C 18/16 |
| 38 42 988 A1 | 6/1989 | Germany | F04C 2/14 |
| 38 01 766 A1 | 7/1989 | Germany | G07C 5/08 |
| 39 28 451 A1 | 3/1991 | Germany | G05D 13/00 |
| 41 27 635 A1 | 2/1993 | Germany | G05D 13/00 |
| 62-167733 | 1/1989 | Japan | F04C 18/16 |
| 62-218939 | 3/1989 | Japan | F04C 18/16 |
| 64-19670 | 8/1990 | Japan | F04C 18/16 |
| 65-327874 | 8/1991 | Japan | F04C 18/16 |
| 2 123 089 | 1/1984 | United Kingdom | F04C 2/14 |
| WO 91/18206 | 11/1991 | WIPO | F04C 15/04 |

OTHER PUBLICATIONS

Vonnoe, Reinhard "Programmgesteuerte und –geregelte hydrostatische Mobilantriebe", O + P –Othydraulik und Pneumatik, 36, 1992; No.4, pp.206–221.

Stenzel, Adalbert, "Betrieb eines hermetischen Schraubenverdichters in Verbindung mit einem statischen Frequenzumformer", Ki Klima –Kalte –Helzung 7–8, 1988, pp. 325–328.

"Antriebstechnik im Verbund", Antriebsregelungen und –steuerungen, No. 1/2, Jan. 17 1989 pp. 53–55.

(List continued on next page.)

*Primary Examiner*—Paul Ip
*Attorney, Agent, or Firm*—Chilton, Alix & Van Kirk

[57] ABSTRACT

In a displacement machine for compressible media having at least two rotors (14a–c) which are configured as profiled bodies and whose profiles engage with one another in the manner of gearwheels during rotation, the individual rotors are respectively driven by their own electric motors (9a–c) and are kept synchronous in rotational speed and angular position by electronic closed-loop and/or open-loop control units (1; 25a–c) in accordance with the transmission ratio of the displacer unit stage. The electronics can be employed for monitoring further operating data of the pump and also for matching the pump output by changing rotational speed. It can also be used as an overload protection. The rotational speeds and rotational attitudes of the rotors are controlled individually and independently of one another, the required attitude values being specified to the individual control units (25a–c) by means of a main control unit (1).

21 Claims, 3 Drawing Sheets

OTHER PUBLICATIONS

Kessler, Gerhart, "Digitale Regelung der Drehzahl und der Relation zweier Drehzahlen", Digitale, Signalverarbeitung in der Regelungstechnik, VDE–Buchreihe, Bd.8, pp. 152–163.

Volk, Paul, "Automatisierung mechanischer Produktionsprozesse", Sonderdruck aus der Elektrotechnischen Zeitschrift, Ausgabe A, 83. Jahrg., 1962, 26.Heft, pp. 893–900, Siemens–Schuckertwerke AG, pp. 3–11.

Bernhard and Knuppertz, "Thyristoren in der Antriebssteuerung und –regelung", Vogel–Verlag, Würzburg, 1976, 2.Aufl., pp. 198–201.

DISPLACEMENT MACHINE WITH ELECTRONIC MOTOR SYNCHRONIZATION

BACKGROUND OF THE INVENTION

(1) Field of the Invention

The invention relates to a displacement machine for compressible media, in particular a dry-running evacuation pump, having at least two rotors which are configured as profiled bodies and whose profiles engage with one another in the manner of gearwheels during rotation and run without making contact with one another, the rotors being respectively driven by their own electric motors.

(2) Description of the Related Art

These displacement machines are invariably multi-shaft machines. The rotor profiled bodies arranged on these shafts run in a housing and, specifically, with a very narrow clearance both between the flanks of the profiled bodies relative to one another and relative to the housing walls surrounding the profiled bodies at the ends and at the outer periphery. Spaces between the flanks of the individual rotors and the inner wall of the housing are released and contracted again by the rotation of the profiled bodies, it being possible for delivery medium to flow into this space through appropriately arranged control edges/ports during the release of the space and for the compressed medium to emerge again through other appropriate control edges/ports during the contraction of the space.

So that the delivery function can be fulfilled in an optimum manner, i.e so that a high efficiency and a high level of operational reliability can be achieved, the narrow clearances mentioned above, between the profiled body flanks relative to one another and relative to the housing walls, are necessary, on the one hand, because the spaces at different pressures within the pump are sealed against one another by the resulting gaps and loss flows through these gaps directly affect the efficiency of the pump. On the other hand, the rotors must however run together without making contact despite the very narrow clearance, i.e. they must rotate relative to one another at each instant in an accurately defined rotational speed relationship and with an exactly determined angular attitude or angular position.

One possibility for ensuring this synchronization is the use of gearwheels. These have a fixed arrangement on the rotor shafts parallel to the displacement bodies and are accommodated in gearboxes located to the side. This places very high requirements on the accuracy of the gearwheels and on the circumferential backlash between the flanks if the accurate running of the rotors relative to one another, as described above, is to be ensured. The same applies to the fixing of the gearwheels with respect to the setting of rotor profiles, i.e. in order to achieve this synchronization of the various rotors, a very high level of effort has to be applied to the accuracy of manufacturing and assembly. Further disadvantages of this known solution are associated with the relatively high design volume and weight and in the sealing which is necessary between the gearboxes and the pump delivery space. This sealing is necessary because the gearwheels must, of course, run with appropriate oil lubrication and oil or oil mist must not pass into the delivery medium. Particularly in the case of vacuum displacement machines, the extra requirements due to the necessary sealing between the oil-lubricated gearwheel synchronization mechanism and the desirably oil-free delivery space are very substantial because of the low absolute pressures and the simultaneously high pressure ratios. Furthermore, this sealing problem can never be solved completely satisfactorily because the shaft seals either have noticeable leakage or are subjected to very high wear.

Because of the large design volume and the weight of this solution, high costs naturally arise during the procurement and also during the assembly and dismantling—i.e. during the repair—of such a pump.

In order to avoid the disadvantages mentioned, the individual rotors can each be driven by their own electric motors and these can be controlled to run synchronously with respect to angular position and rotational speed by means of electronic closed-loop control and/or open-loop control units to correspond with the transmission ratio of the displacement stage. Because of the electronic measurement of the individual rotor settings and the comparison of the rotational speed and angular position, together with correction of the data of at least one or, if necessary, of both motors, exactly defined relative angular attitudes and absolute positions of the rotors relative to one another can be maintained at each instant. A precondition for this is, of course, to keep within a maximum permissible angular difference. It may be easily seen that all the requirements for mechanical synchronization can be dispensed with in the case of such an electronic open-loop and/or closed-loop control. Although there is an additional requirement for at least one electric motor and the electronic closed-loop and/or open-loop units, the total requirements for the pump are, overall, markedly less than in the case of the known mechanical control. The powers of the individual motors used in the case of the closed-loop and/or open-loop control according to the invention can then, of course, be correspondingly smaller than the motor power of a single motor in the case of conventional mechanical control. In addition, the closed-loop and/or open-loop units, and also the motors, are less susceptible to wear, have lower noise and are more reliable than the conventional gearwheel mechanism.

A screw-type compressor with two screw-type rotors is known from "Patents Abstracts of Japan", M-838, 15 Jun. 1989, Vol. 13/No. 258, in which the rotors are driven by means of individual motors and are synchronized electronically. For this purpose, the rotational phases and the rotational speeds of the motors are recorded and, if necessary, matched to one another.

WO 91/18206 shows a twin-shaft displacement machine in which the angular positions and the speeds of the rotors are determined by means of a resolver measuring system in order to synchronize the rotors with an external control unit.

Although these two known systems are advantageous because they do not use a synchronization mechanism, relatively large tolerances must, on the other hand, be permitted due to the design of the appliance and the sensors (these are, for example, ±4° in the appliance according to WO 91/18206) so that the appliances are only suitable for delivering liquids.

In contrast, however, the requirement exists for so-called "dry-running" vacuum pumps. The designation "dry-running" here relates to the complete avoidance of oil in the whole of the appliance, i.e. dispensing with oil in the side spaces for the lubrication of rolling contact bearings, shaft seals, gearwheels, etc. in addition to freedom from oil in the pump space.

In a previously known displacement machine of this kind (EP-A-0 502 459), the above disadvantages are at least partially avoided. Here, a description is given of a closed-loop rotational-speed control system for at least two rotors driven by separate motors. This system is intended to enable the two nested rotors to run without touching one another.

However, the appliance still requires gearwheels for rough synchronization, the said gearwheels engaging in one another and being intended to prevent the sensitive surfaces of the rotors from touching one another. The electronic closed-loop control system is thus obviously imperfect. The merit of the invention lies in the recognition that difficulties for which the previously known electronic closed-loop rotational-speed control system is inadequate occur only in limiting cases.

SUMMARY OF THE INVENTION

It is therefore the object of the invention to provide a displacement machine of the type just mentioned in which damaging contact between the rotors can be avoided even without the use of interengaging gearwheels and even under critical operating conditions.

The invention takes as its starting point a displacement machine for compressible media, in particular a dry-running evacuation pump, having at least two rotors which are configured as profiled bodies and whose profiles engage with one another in the manner of gearwheels during rotation and run without making contact with one another, the rotors being respectively driven by their own electric motors, the motors being controlled to run synchronously with respect to angular position and rotational speed by means of electronic closed-loop control and/or open-loop control units, each motor having associated with it its own drive control unit which operates independently of the drive control units of other motors, required control values being supplied to the drive control units by a main control appliance, each motor being controlled individually and independently, and control being based on centrally specified required control values and being performed in a decentralized manner.

There is a recognition according to the invention that, during the starting of the pump, difficulties can arise due to partial jamming of the rotating parts. According to the invention, this can be corrected by integrating a starting torque pulse generator into the electronic closed-loop and/or open-loop unit. In this arrangement, a torque pulse of specifiable strength is transmitted repeatedly at predeterminable short intervals, if necessary with different orientation, to the pump motors until the jammed rotor part comes free and the pump can be operated correctly.

Critical operating conditions or their damaging consequences can also be avoided with a displacement machine in accordance with claim 3.

In a further embodiment of the invention, it is proposed that the rotors be manufactured from materials which have good emergency running properties or that the rotor surfaces be coated with such materials. This has the advantage that should an open-loop or closed-loop control system not be set up or not be optimally set up during the starting phase or in the case of a mains failure, the flanks of the rotors do not suffer any damage when they come into contact with one another.

It is furthermore advantageous to make the distance apart of the mating flanks of the rotors less in regions of small relative motions than in regions of larger relative motions. Like the previously mentioned measure, this also serves the objective of avoiding damage or, in any event, of keeping it small in the case of a possible contact between the rotor flanks.

Standard motors with a normal shaft end are an obvious low-cost solution as drive motors.

Built-in motors which are completely encapsulated towards the outside can be used for the drive of the individual rotors for a leakage-free drive in which emergence of the delivery medium should be avoided. The known spindle kit motors represent a particularly advantageous form.

As an alternative to the built-in motors just mentioned, canned motors can also be used for driving the rotors in accordance with the invention in the case, for example, of aggressive media. This avoids attack on the stator windings and saves the complicated and necessary stator winding corrosion protection which previously had to be applied.

So that the satisfactory function of the pump can be checked from outside, it is also proposed, in accordance with the invention, to connect monitoring units to the pump which measure rotational speed, relative angular position, running accuracy, temperatures, slip and rotational direction and transmit these data to a display unit which is connected to them and which can be monitored from the outside.

Furthermore, the pump output can be advantageously matched in an optimum manner to the particular output required by means of the available electronic open-loop/closed-loop control by rotational speed variation.

In order to protect the installation, an overload protection for the motors and the pump can be advantageously integrated in the electronic closed-loop and/or open-loop unit, which overload protection provides a preliminary warning by means of an optical and/or acoustic signal output and, after a previously determined time interval, automatically switches off the installation or reduces the rotational speed. By this means, severe damage to the installation can, as a rule, be avoided.

It is advantageous to use a required attitude value as the required control value for the corresponding rotor, which required attitude value is converted into a required rotational speed value after inspection of the attitude of the corresponding rotor.

The method according to the invention operates with central open-loop control and decentralized closed-loop control. Specifications for the operating behaviour of the individual drives are provided by a centrally arranged main control unit. The generation of these specifications, i.e. the generation of the required values for the individual rotors, could be designated as a "virtual rotor". This "ideal machine" has no deviations from the precalculated angular attitudes.

By means of its own control system, each drive unit follows the specification by using the corresponding required attitude value. This occurs in each system independently of the other parallel branches so that, intrinsically, the only objective of each drive unit is to assume the angular attitude which matches the virtual rotor.

On the basis of this control design, the machine automatically executes the so-called "homing" operation. This means that the rotors automatically take up their ideal position when starting or during operation. In contrast to gear-synchronized machines in which the synchronization is set once on assembly, the latter operation is unnecessary, in accordance with the invention, because the machine is self-synchronizing and the synchronization is adjusted continually.

For self-diagnosis purposes, means can also be provided to deflect the machine somewhat from synchronous running. It is then possible to check how rapidly the machine executes the "homing" operation and whether the rotors return to the initial relative attitude or take up a new, deviant relative attitude.

DETAILED DESCRIPTION OF THE PREFERRED EMBODIMENT

Figure 1:
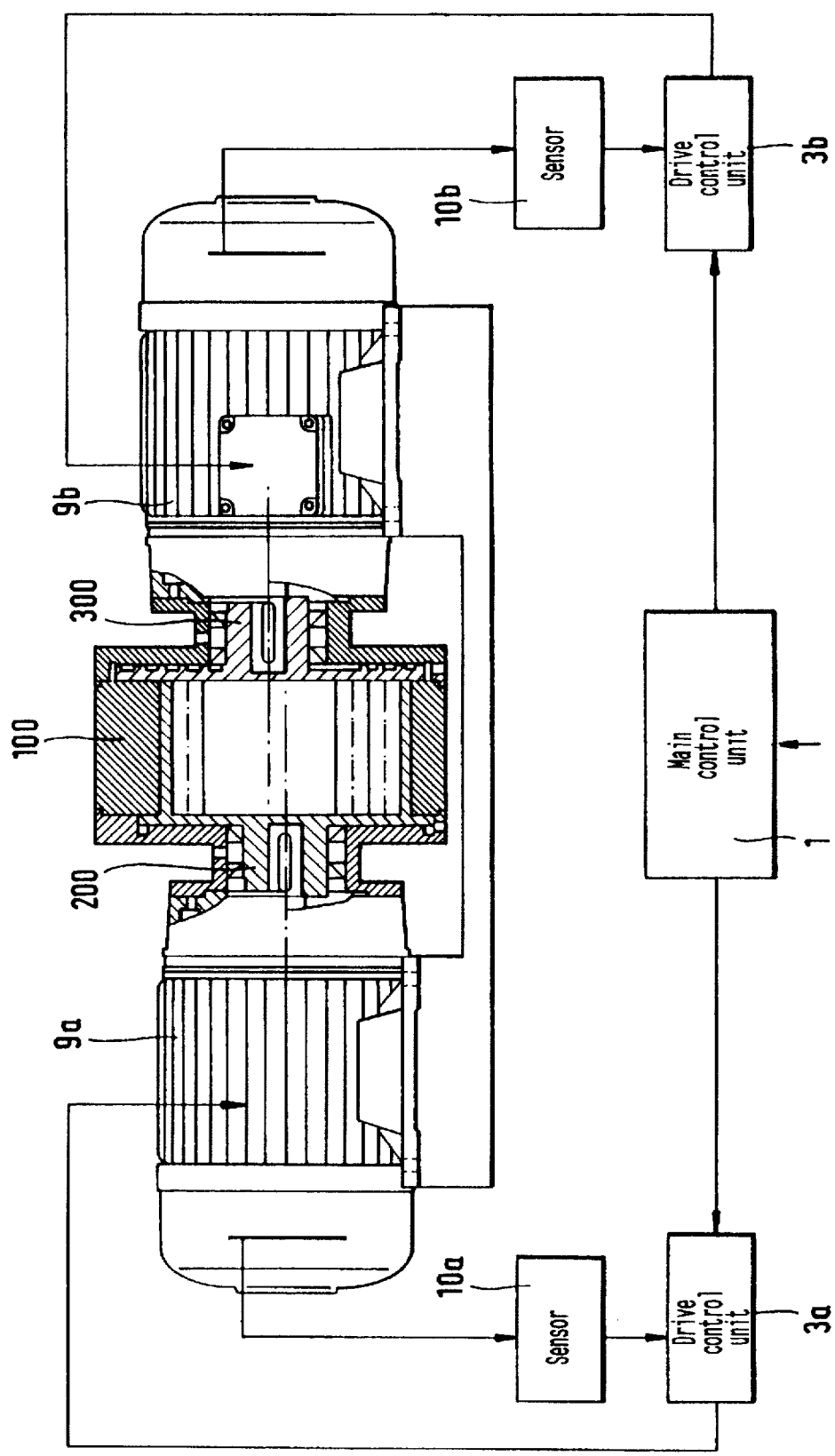
FIG. 1 shows a displacement machine with an electronic closed-loop and open-loop control in which each motor is operated by its own independent control circuit.

In FIG. 1, the displacement machine 100 includes two displacement rotors with rotor shaft extensions 200 and 300 which are respectively driven by separate electric motors 9a and 9b. A measurement system is installed on the free shaft end of each of the electric motors and this measurement system, embodied as a sensor 10a or 10b, exactly measures the instantaneous angular position for each motor shaft and, by differentiation with respect to time, determines the respective angular velocity. These values are relayed to drive control units 3a and 3b, respectively. These control appliances can, for example, obtain their electrical energy from a supply unit or main control unit 1 which can be directly connected to the mains supply. Depending on the required value specification and the actual measured values continually arriving from the measurement systems 10a and 10b, this electrical energy is relayed to the individual electric motors 9a and 9b by the control appliances 3a and 3b in such a way that the required accuracy with respect to angular position and rotational speed between the displacement rotors in the displacement machine can be continually maintained. The maximum positional deviation can then, with certainty, be only a few minutes of angle.

Figure 2:
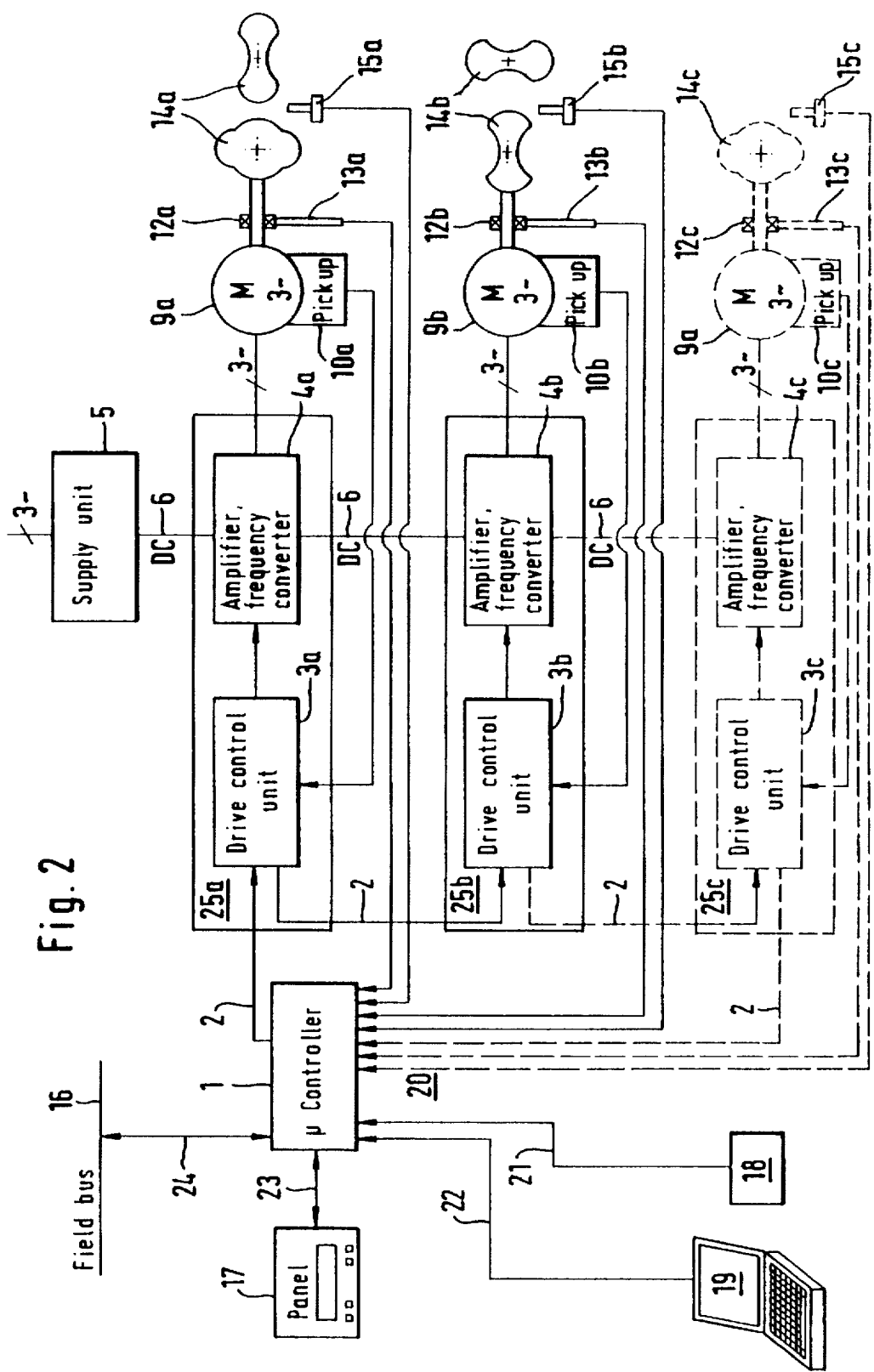
FIG. 2 shows, diagrammatically, the structure of a multistage displacement machine with the associated open-loop and closed-loop systems.

FIG. 2 shows the structure of an open-loop and closed-loop system for a two-stage or three-stage displacement machine, the third stage being represented by interrupted lines.

Measured values from the process, for example by means of sensors for pressure, various temperatures, 15a–c, bearing condition 13a–c, etc., are recorded from the displacement unit by means of standardized electrical interfaces 20. Further operating data such as engine current, rotational speed and attitude angle, etc., can be recorded by means of an interface which is associated with the drive.

Depending on the application, an optical incremental pick-up 10a–c, but preferably one operating magnetically/inductively, is employed for recording rotational speed and attitude angle. An accuracy in the range of seconds of angle—or up to a few minutes of angle as a maximum—can be achieved by means of these sensors. Because of the high level of accuracy of the sensors, the accuracy of the control system can be raised to the point where a dry-running vacuum pump can be achieved. Other types of sensors with at least similar resolution capability can likewise be employed.

In the embodiment represented, a microcontroller 1 is used as the main control device and this accepts the corresponding measured values from the sensors via the interface 20. In addition, the microcontroller 1 generates required attitude values for drive control units 3a–c for the individual motors 9a–c. The generation of the individual required attitude values for the displacement rotors 14a–c can be designated as the generation of a "virtual rotor". This virtual rotor guides the displacement rotors and determines the rotational speed and the instantaneous attitude angle of all the rotors at each instant. This virtual rotor is generated by software in the microcontroller 1.

From the input of measured values, the micro-controller 1 determines the optimum operating conditions for the machine and, by means of the virtual rotor, guides the real rotors.

Compared with a physically constructed guide rotor, this method has the advantage that the vibration phenomena and instability of an engineering structure scarcely occur and a high level of synchronism is ensured in the motion of the rotors relative to one another. The adjustment of the synchronous running and the constant angular location of the motor rotors relative to one another is centrally guided with decentralized closed-loop control. Once the co-ordinate systems of the rotors have been aligned relative to one another, they always assume a relative angular attitude which, during rotation, excludes contact between the displacer units 14a–c and therefore replaces a mechanical transmission.

A bus system capable of real time operation is employed for the transmission of the required values to the rotors 14a–c. Behaviour which is exactly controlled in time is achieved by means of the fixed cycle time of the bus system and the guaranteed response time of all participants connected thereto. The bus concept, which has a maximum number of participants markedly greater than 3 (a main control device and two drive control units), permits an increase in the number of the rotors and the construction of a multi-stage displacement machine. This also reveals an essential advantage of the central open-loop control and the decentralized closed-loop control because all the rotors can be simultaneously guided by this means; the rotors are controlled independently of one another and follow the required attitude value so that transient phenomena can be avoided, as can destabilization of the system which can occur if the attitude of higher stage rotors is controlled as a function of the attitude of a preceding rotor.

A direct current intermediate circuit 6 is also provided and, given the choice of a suitable supply unit 5, this makes it possible to connect a freely selected number of drive units, so that a multi-rotor pump structure is supported by this means also.

Part of the measured values from the sensors 10a–c, 12a–c, 15a–c is deposited in the internal data memory of the microcontroller 1 for diagnosis purposes. Conclusions on the condition of the pump are drawn from these measured values so that continuous self-inspection can be carried out. When a possible defect is recognized (for example rise in temperature, damage to the rolling contact bearing 12a–c), it is possible to react in an adequate manner.

Frequency converters 4a–c are connected downstream of the drive control units 3a–c and the behaviour of the system can be matched in an optimum manner to the requirements of the particular process employed by means of the microcontroller 1 and the high-speed digital control units 3a–c.

An operating panel 17 can be connected by means of an interface 23 (RS 232) to allow measured values to be interrogated or operating data to be altered by means of a keyboard. A personal computer (PC) 19 can, if required, be connected via a further interface 22 for service or diagnosis purposes. A field bus interface 24 is installed for remote monitoring. In addition to the interventions which can be undertaken by means of the panel 17 and the PC 19, data are transmitted via the interface 24 and via the field bus 16 to a control stand.

Binary sensor signals 18 can be accepted and signals can be emitted by the microcontroller 1 via parallel runs of digitally operating input/output channels. This unit makes it possible, for example, to monitor safety switches or to activate light diodes for user information.

Figure 3:
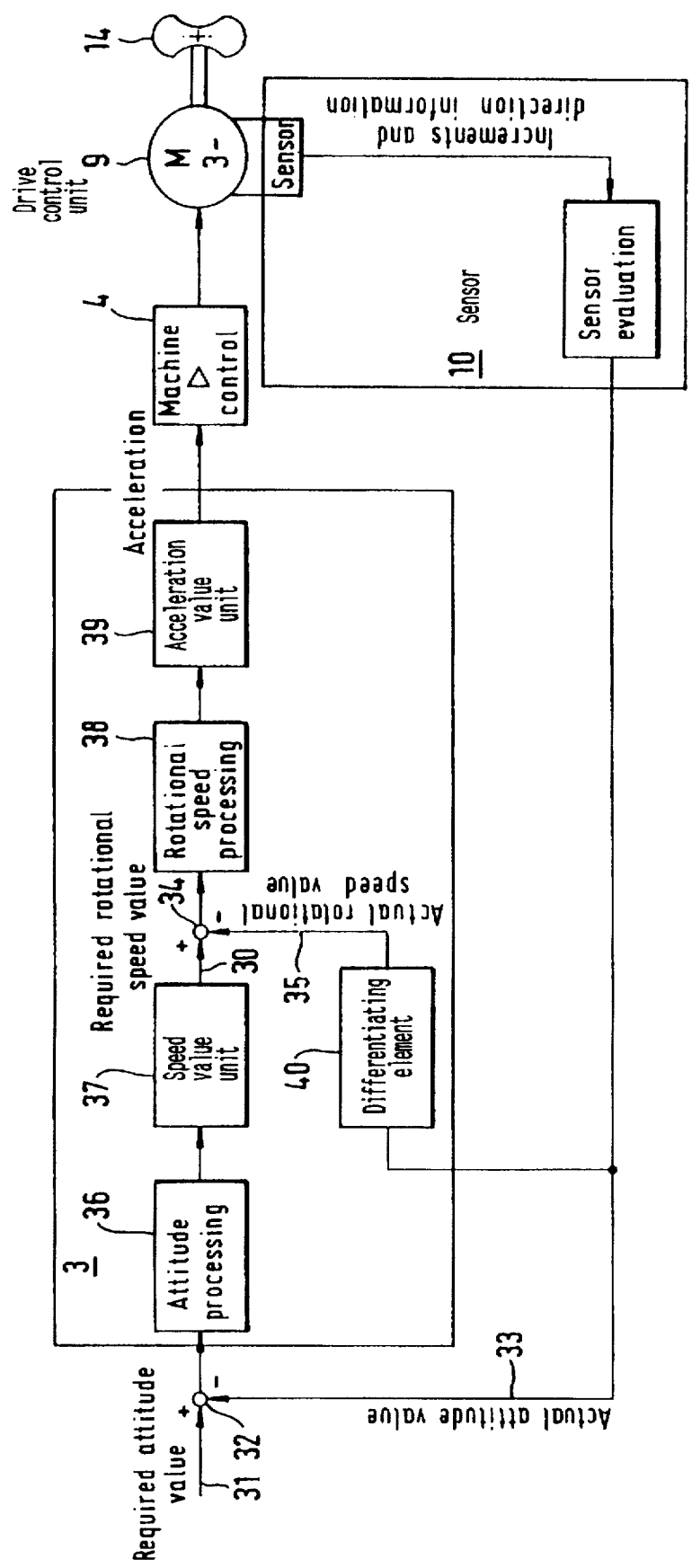
FIG. 3 shows, diagrammatically, the structure of the drive control unit for a motor.

Since all the drive control units have an essentially similar structure, only one drive control unit is represented, as an example, in FIG. 3. A sensor unit 10 is connected to the motor 9; this sensor unit determines the attitude condition of the motor 9, and therefore the attitude condition of the rotor 14, and emits an actual attitude value 33. This actual attitude value is supplied to the negative input of a subtracting element 32. At its positive input, the subtracting element 32 receives a required attitude value 31 from the main control unit 1 (cf. FIG. 2). The subtracting element forms the difference between the required attitude value and the actual attitude value and emits the difference signal to the drive control unit 3.

The drive control unit 3 first carries out an attitude processing operation 36 which, for example, checks whether the attitude difference is located within a specified tolerance. If, as an exception, this condition is not met, a release signal can, for example, be emitted to the main control unit via a conductor (not represented). The main control device can then, if necessary, reduce the rotational speed of the "virtual rotor" or switch off the machine. In addition, an acoustic and/or optical display signal can be emitted. A required rotational speed value 30 is subsequently determined, in a unit 37, from the attitude difference and is supplied to the positive input of a further subtracting element 34. An actual rotational speed value 35 is supplied to the negative input of the subtracting element 34, this actual value 35 being obtained from the actual attitude value by means of a differentiating element 40. The subtracting element 34 forms the difference between the required rotational speed value 30 and the actual rotational speed value 35 and supplies the rotational speed difference signal obtained in this way to a rotational speed processing operation 38. The rotational speed processing operation 38 checks whether the rotational speed difference is located within specified limits. If necessary, it is again possible to generate a release signal in this case, as in the case of the attitude processing. The rotational speed difference is then converted into a rotational speed change signal or an acceleration signal in a unit 39 (the acceleration then, of course, includes rotational speed increases or rotational speed decreases). The acceleration signal is then supplied to the machine control system 4, which appropriately controls the motor 9. The control procedure described above is continually carried out at very short intervals.

In the embodiment presented above, it has been assumed that the main control device generates and emits a different required attitude value for each drive control unit. Because, however, the relative attitudes of the rotors do not change in the "ideal machine", it is also possible to supply the same required attitude value to all the drive control units and to allow for the (constant) attitude difference for the relevant rotor in the attitude processing operation 36 of the respective drive control unit.

It is possible to construct a rapid and accurate synchronous control for multi-stage displacement machines by means of the individual control of the rotors, according to the invention, which are controlled independently of one another with reference to a "virtual rotor".

We claim:

1. An improved displacement machine for compressible media of the type in which first and second rotors are respectively driven by first and second drive motors such that the first and second rotors are unobstructively synchronized with one another during coordinated motion thereof whereby the rotors do not normally contact one another, in which the angular position and rotational speed of each of the first and second drive motors is independently controlled by an associated drive control unit and an associated electronic control system, and in which each of the electronic control systems receive predetermined control values from a centralized main control unit, wherein the improvement comprises:

a starting-torque pulse generator associated with each of the electronic control systems, said pulse generator repeatedly transmitting torque pulses of predetermined magnitudes at predetermined intervals to the first and second drive motors to initiate rotation thereof whereby the first and second rotors initiate synchronized coordinated motion.

2. The displacement machine of claim 1, wherein the centralized main control unit includes an overload protection device to protect said displacement machine from being damaged in the event that the first and second rotors become obstructed said protection device providing a warning signal in the event of rotor obstruction and causing at least one of rotational speed reduction and shut-down of the first and second rotors in the event of rotor obstruction.

3. The displacement machine of claim 1, wherein the distance between the first and second rotors is smaller where the relative motion between the first and second rotors is smaller, and wherein the distance between the first and second rotors is greater where the relative motion between the first and second rotors is greater.

4. The displacement machine of claim 1, wherein the distance between the first and second rotors is directly related to the difference in rotational speed therebetween.

5. The displacement machine of claim 1 wherein the first and second drive motors comprise standard electric motors having normal shaft ends extending therefrom and wherein each of said first and second rotors rotates with the shaft of its associated drive motor.

6. The displacement machine of claim 1, wherein the first and second drive motors comprise spindle kit motors.

7. The displacement machine of claim 1, wherein the first and second drive motors comprise canned motors.

8. The displacement machine of claim 1, further comprising a monitoring unit associated with each of the first and second motors, each of said monitoring units monitoring at least one of the rotational speed, angular position, running accuracy, temperature, slip and rotational direction of its associated motor and transmitting the monitored information to the centralized main control unit.

9. The displacement machine of claim 8, wherein said centralized main control unit includes a display unit, for displaying the monitored information transmitted to the centralized main control unit.

10. The displacement machine of claim 1, wherein said machine comprises a dry-running evacuation pump.

11. The displacement machine of claim 1, wherein the electronic control circuits determine the output of said displacement machine by varying the rotational speed of the first and second drive motors.

12. An improved displacement machine for compressible media of the type in which first and second rotors are respectively driven by first and second drive motors such that the first and second rotors are unobstructively synchronized with one another during coordinated motion thereof whereby the rotors do not normally contact one another, in which the angular position and rotational speed of each of the first and second drive motors is independently controlled by an associated drive control unit and an associated electronic control system, and in which each of the electronic control systems receive predetermined control values from a centralized main control unit, wherein the improvement comprises:

an overload protection device associated with the centralized main control unit, said protection device protecting said displacement machine from being damaged in the event that the first and second rotors become obstructed, said protection device providing a warning signal in the event of rotor obstruction.

13. The displacement machine of claim 12, wherein said protection device causes at least one of rotational speed reduction and shut-down of the first and second motors in the event of rotor obstruction.

14. The displacement machine of claim 12, wherein each of the electronic control systems further comprises a starting-torque pulse generator which repeatedly transmits torque pulses of predetermined magnitudes at predetermined intervals to the first and second drive motors to initiate rotation thereof whereby the first and second rotors initiate synchronized coordinated motion.

15. The displacement machine of claim 12, wherein the distance between the first and second rotors is directly related to the difference in rotational speed therebetween.

16. The displacement machine of claim 12, further comprising a monitoring unit associated with each of the first and second motors, each of said monitoring units monitoring at least one of the rotational speed, angular position, running accuracy, temperature, slip and rotational direction of its associated motor and transmitting the monitored information to the centralized main control unit.

17. The displacement machine of claim 12, wherein said machine comprises a dry-running evacuation pump.

18. A method of controlling a displacement machine having first and second rotors which are respectively connected to first and second drive motors for rotation therewith such that the first and second rotors are unobstructively synchronized with one another during coordinated motion thereof whereby the rotors do not normally contact one another, the displacement machine also having a drive control unit and an electronic control system associated with each of the first and second drive motors to independently control the angular position and rotational speed of the first and second drive motors, the displacement machine further having a centralized main control unit which is connected to each of the electronic control systems for transfer of information therebetween, said method comprising the steps of:

transmitting position data from the centralized main control unit to each of the electronic control systems;

creating rotational speed data from the position data after reception thereof by the electronic control systems;

delivering starting-torque pulses of predetermined magnitudes at predetermined intervals from each drive control unit to its associated drive motor to initiate rotation of the first and second rotors such that the rotors are unobstructively synchronized with one another during coordinated motion thereof whereby the rotors do not normally contact one another;

delivering subsequent torque pulses from each drive control unit to its associated drive motor of a magnitude and interval determined by the attitude values such that the first and second rotors are unobstructively synchronized with one another during coordinated motion thereof whereby the rotors do not normally contact one another.

19. The method of claim 18, further comprising the steps of:

monitoring the actual position of the first and second rotors;

comparing the actual position of the first and second rotors with the position data transmitted from the centralized main control unit; and transmitting a trigger signal to the centralized main control unit when the difference between the transmitted position data and the actual position data of the first and second drive motors exceeds a predetermined magnitude.

20. The method of claim 19, further comprising at least one of the step of reducing the rotational speed of the first and second drive motors when a trigger signal is transmitted; and the steps of shutting down the first and second drive motors when at least one drive control unit transmits a trigger signal.

21. The method of claim 18, further comprising the steps of:

monitoring the actual rotational speed of the first and second drive motors;

comparing the actual rotational speed of the first and second drive motors with the rotational speed data created from the position data; and transmitting a trigger signal to the centralized main control unit when the difference between the actual rotational speed and the created rotational speed data exceeds a predetermined magnitude.

* * * * *